March 19, 1968 J. Y. HOWARD 3,374,035
BRAKE CONTROL SYSTEMS FOR MULTIPLE UNIT TRAINS
Filed July 1, 1966 2 Sheets-Sheet 1
FIG. 1
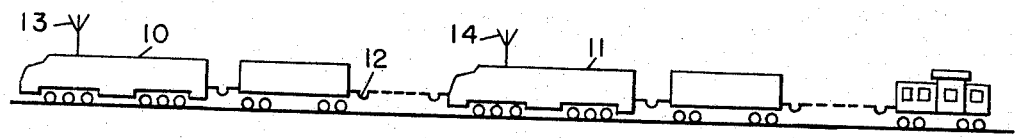
FIG. 2
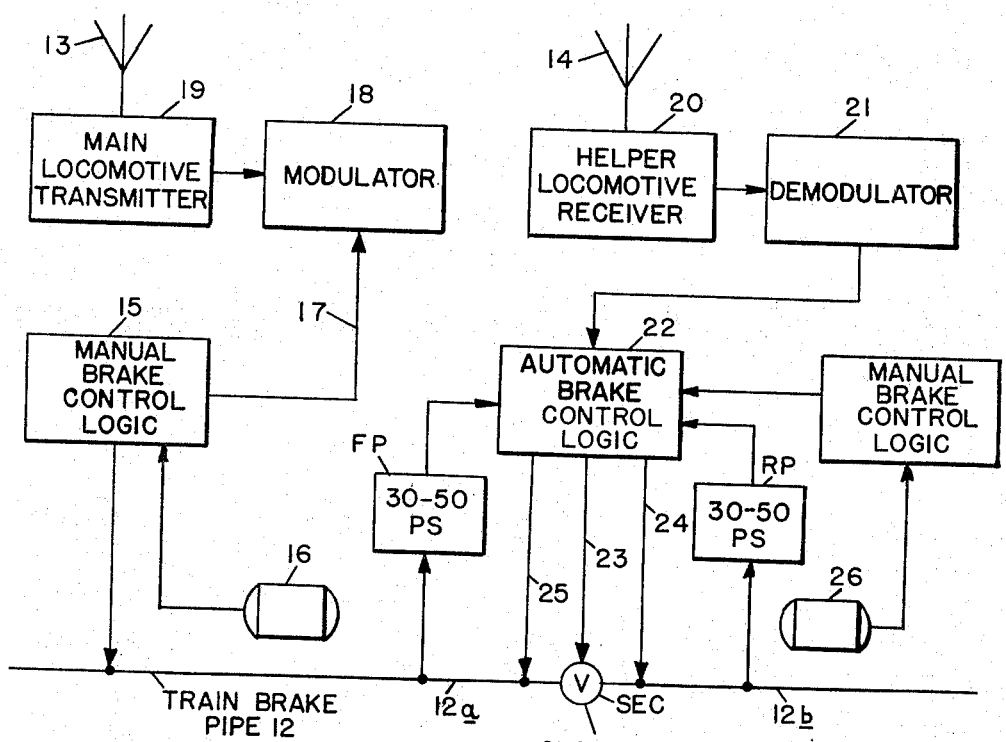
FIG. 4
| | 9A | 9B | 10A | 10B |
|---|---|---|---|---|
| AUTO RELEASE | | X | | X |
| GRAD BRAKING | | X | X | |
| EMERGENCY | X | | X | |
| RESET | X | | | X |
INVENTOR.
J. Y. HOWARD
BY
Forest B. Hitchcock
HIS ATTORNEY

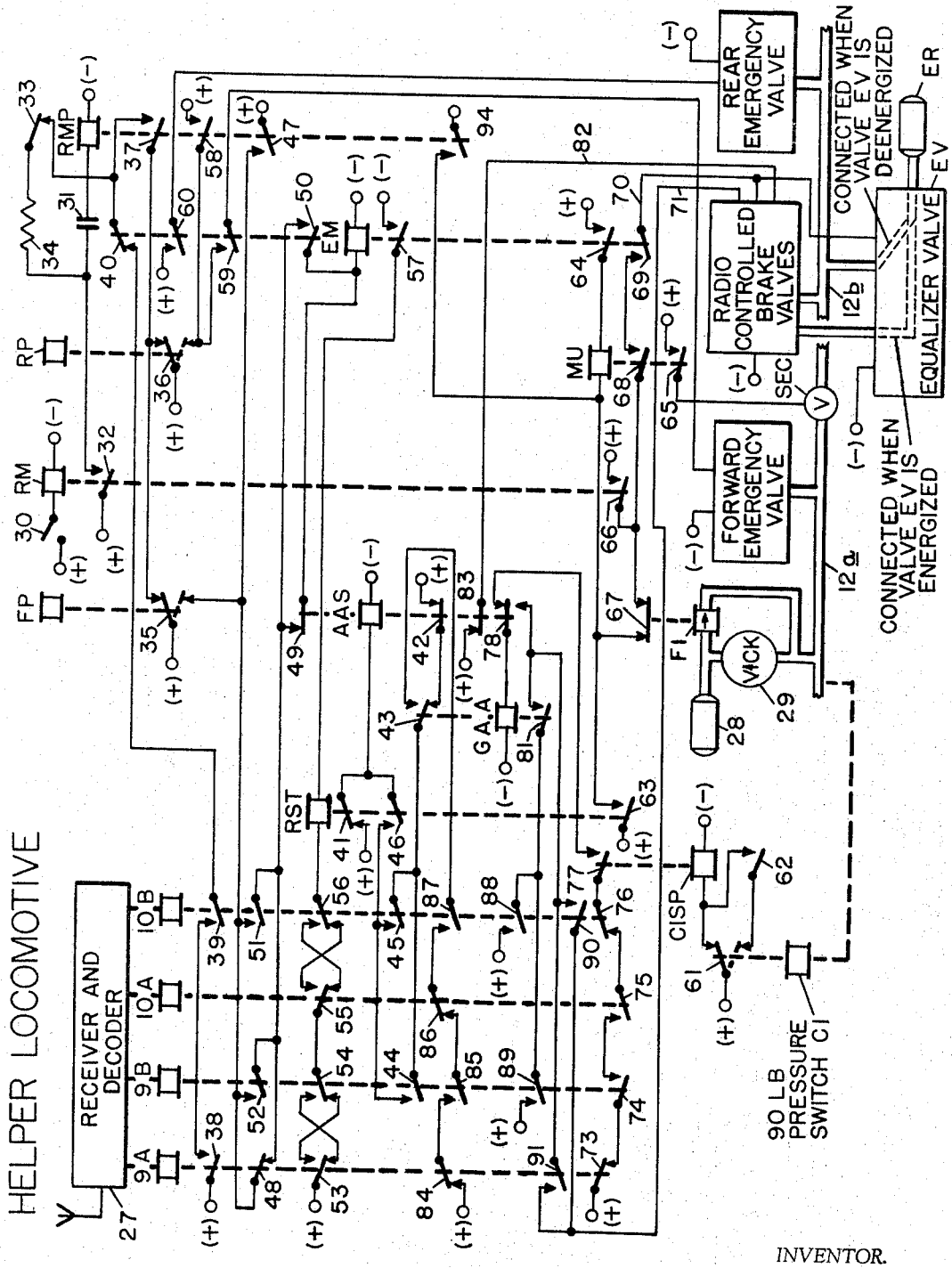

United States Patent Office 3,374,035
Patented Mar. 19, 1968

3,374,035
BRAKE CONTROL SYSTEMS FOR
MULTIPLE UNIT TRAINS
James Y. Howard, Spencerport, N.Y., assignor to General
Signal Corporation, Rochester, N.Y., a corporation of
New York
Filed July 1, 1966, Ser. No. 562,247
8 Claims. (Cl. 303—20)

This invention relates to brake control systems for multiple unit trains, and more particularly pertains to brake control systems in which means is provided for selectively sectionalizing an air brake control pipeline in a train so that it can at times have forward and rear sections subject to control simultaneously by brake control apparatus on different locomotives respectively.

This invention has particular utility in multiple unit train systems wherein there is an automatically operated helper locomotive at an intermediate point in a train. Multiple unit trains are quite long, and if the air brakes on the cars are controlled only by air brake control apparatus on the lead, or main locomotive, there is considerable propagation time involved, and once brakes are applied at the main locomotive, there is a considerable time interval until the brakes are applied on the last car in the train. It is therefore desirable to be able to control the forward and rear brake line sections simultaneously by the main and helper locomotives respectively.

According to the present invention, there is a communication system for communicating designated brake control conditions at the main locomotive to the helper locomotive. As long as this communication system is functioning properly, the air brake control pipeline is sectionalized at the location of the helper locomotive, and the rear section of the brake control pipeline has its pressure controlled by the helper locomotive in accordance with brake control signals communicated from the main locomotive. The forward section of the air brake control line is controlled by the main locomotive when sectionalization is effective the same as when sectionalization is ineffective. In case of failure of the communication system when brakes are applied by the main locomotive, the brake control pipeline is desectionalized at the location of the helper locomotive, and the air brakes for the entire train are put under the control of air pressure in the air brake control pipeline by the main locomotive.

An object of the present invention is to selectively sectionalize an air brake control pipeline of a multiple unit train at the location of a helper locomotive, dependent upon a brake control signal communicated from a main locomotive to the helper locomotive.

Another object of the present invention is to desectionalize a brake control pipeline in a train at the location of a helper locomotive to put all air brakes under direct control of the main locomotive in case brakes are applied by the main locomotive and no brake control signal is communicated from the main locomotive to the helper locomotive.

Other objects, purposes and characteristic features of the present invention will be in part obvious from the accompanying drawings and in part pointed out as the description of the invention progresses.

In describing the invention in detail, reference is made to the accompanying drawings wherein similar reference characters are used to identify corresponding parts throughout the various illustrations, and wherein:

FIG. 1 illustrates a multiple unit train to which the system according to the present invention may be applied;

FIG. 2 illustrates mostly by block diagram one embodiment of the present invention as applied to the selective sectionalization of a brake control pipeline in a multiple unit train;

FIG. 3 illustrates circuit logic according to one embodiment of the present invention that may be employed to selectively control the sectionalizing of the air brake control pipeline of a multiple unit train; and FIG. 4 is a code table illustrating how distinctive brake control codes can be set up for communication from the main locomotive to the helper locomotive.

With reference to FIG. 1, a typical multiple unit train is illustrated having a main locomotive 10 at the head end of a train, and a helper locomotive 11 at an intermediate point in the train. An air brake control pipeline 12 extends throughout the length of the multiple unit train. The main locomotive 10 has radio communication apparatus including an antenna 13 for communicating brake control signals to the helper locomotive 11. Helper locomotive 11 has receiving apparatus including an antenna 14 for receiving these signals.

With reference to FIG. 2, the main locomotive is illustrated as having manual brake control logic 15 for controlling the air pressure in the air brake control pipeline 12. A main air reservoir 16 is provided on the main locomotive in accordance with the conventional practice in brake control systems. In accordance with operation of the manual brake control logic 15, brake control codes are selected and applied over line 17 to a suitable modulator 18 which converts these codes into signals for transmission by a suitable main locomotive transmitter 19 to a suitable helper locomotive receiver 20 on the helper locomotive. These signals are demodulated by demodulator 21 and applied to automatic brake control logic 22 for the control of the sectionalizing of the brake control pipeline, and for the control of the degree of braking for the section of the pipeline in the rear of the helper locomotive to correspond with the degree of braking that is being applied by the main locomotive.

The communication system for communicating brake control signals from the main locomotive to the helper locomotive is normally active, and in accordance therewith, the reception of a signal at the helper locomotive causes the automatic brake control logic 22 to provide an output as is indicated by the line 23 to energize the sectionalizing valve SEC. Such energization causes the valve SEC to be closed in the pipeline 12 and thus to sectionalize the pipeline into a forward section 12a and a rear section 12b. These two sections are controlled by the main and helper locomotives respectively. If energy is removed from the valve SEC, the valve SEC opens and the brake pipe 12 becomes desectionalized, thus permitting the control of the brakes of the entire train from the main locomotive as if the helper locomotive were not present in the train.

When the brake control line is sectionalized, the automatic brake control logic 22 that is associated with the helper locomotive is effective over the line 24 to control the air pressure in the rear section of the brake line in accordance with the brake control code that is communicated from the main locomotive. Furthermore, under certain emergency conditions to be hereinafter considered, the automatic brake control logic 22 can be effective to reduce pressure in the forward section 12a of the brake control line as represented by the line 25 to cause application of the air brakes of the cars in the forward section in accordance with an emergency condition. As a means for detecting reduction in brake pressure corresponding to an emergency condition in the forward section 12a of the brake control line, a forward pressure switch FP is provided in the forward brake line 12a. This switch will open its emergency control contacts when pressure is reduced to a point below 30 pounds per square inch and close its emergency control contacts when pressure is built up to 50 pounds per square inch. Similarly, pressure switch RP is provided in the rear brake line section 12b.

This switch will also open its emergency control contacts only in accordance with reduction of pressure to a point below 30 pounds pressure. The helper locomotive has a conventional main air reservoir 26 associated with maintaining pressure in the rear section 12b.

The mode of operation of the system according to FIG. 2 is such that as long as the communication link between the main locomotive and the helper locomotive is intact, the sectionalizing valve SEC is closed, and the main locomotive and the helper locomotive maintain corresponding air pressures in the respective forward and rear sections 12a and 12b. If the brakes are applied by the main locomotive, a code characteristic of the application is converted into signals that are transmitted by radio to the helper locomotive, and the reception of these signals causes the automatic brake control logic 22 to select a corresponding degree of braking to be applied by the helper locomotive to the section of the train in the rear of that locomotive over the brake control section 12b. If anything should happen that the line of communication between the main locomotive and the helper locomotive is broken, the sectionalizing valve SEC becomes opened because of loss of energy in its control circuit over line 23, and thus the system reverts to an unsectionalized condition wherein the main locomotive has control of the entire train.

The system according to FIG. 2 when sectionalized is operable in case of an emergency braking condition in one section to cause the adjoining section to also provide an emergency application of the brakes. Thus, for example, if the forward section 12a loses its air pressure, as would be the case if the brake line of that section should become broken, the loss of pressure is sensed by the pressure switch FP, and the pressure switch FP thus causes the automatic brake control logic 22 to correspondingly reduce the pressure in the rear section 12b over line 24. Similarly, if brake pressure is materially reduced in the rear section 12b as by the breaking of the air line in that section, this condition is sensed by the pressure switch RP, and the operation of the pressure switch RP causes the automatic brake control logic 22 to correspondingly reduce the pressure in the forward section 12a over line 25. From the above described mode of operation, it will be apparent that a break in the train either ahead or in the rear of the location of the helper locomotive 11 will cause the application of the brakes of the entire train through the control of the automatic brake control logic 22 at the location of the helper locomotive, without requiring any control on the part of the operator of the main locomotive.

The automatic brake control logic 22 of FIG. 2 can comprise the circuits illustrated in FIG. 3. FIG. 3, however, includes additional sophistication in the circuit logic that is not required for operation of the system as it has been described according to FIG. 2, and it is intended that FIG. 3 should be considered as an example of how the control logic 22 of FIG. 2 can be organized.

The helper locomotive control apparatus illustrated in FIG. 3 is assumed to be governed by a communication system such as has been described wherein a receiver and decoder 27 is governed by brake control signals received from the main locomotive. These signals are assumed to be coded over two channels of communication, one channel providing a control for a relay 9A or 9B in accordance with the manner in which the channel is modulated, and similarly a second channel being effective to energize a relay 10A or 10B in accordance with the manner in which that channel is modulated. Different codes received may designate respectively emergency braking, graduated braking automatic brake release, and reset as is shown in FIG. 4. The code for emergency braking calls for the energization jointly of relays 9A and 10A; the code for graduated braking requires the energization jointly of relays 9B and 10A; the code requiring reset calls for the energization jointly of relays 9A and 10B, and the code for automatic brake release calls for the energization jointly of relays 9B and 10B.

A relay RM is provided for putting the system into operation after the communication system has been placed in operation. This relay has a repeater relay RMP associated therewith.

An emergency control relay EM is provided for controlling the emergency application of the brakes at the location of the helper locomotive. This relay is normally energized, and the dropping away of this relay causes the application of the brakes of the entire train by the reduction in air pressure of both forward and rear sections 12a and 12b of the air brake pipeline 12.

A reset relay RST is provided for the purpose of resetting the automatic control apparatus at the helper locomotive after a brake application. Relays GAA and AAS are provided for the purpose of controlling the brakes at the helper locomotive to correspond with brake control codes received from the main locomotive so that the helper locomotive provides the same degree of braking in the rear section of the train as is provided simultaneously by the main locomotive for the forward section. A relay MU is provided for governing the operation of the sectionalizing valve SEC and for the purpose of permitting the control of the brakes of the helper locomotive by radio control from the main locomotive. A relay CISP is provided at the helper locomotive for registering when the brake pipes are fully charged upon the brakes becoming initially released.

A pressure tank 28 is provided as a part of a sensing system for determining at the helper locomotive when the brakes are applied in the forward section 12a of the brake control pipeline. This tank is connected to the forward section 12a through a check and choke valve 29, and the check valve is bridged by a flow indicator FI which registers when the pressure in the pipeline section 12a is less than the pressure in the storage tank 28.

Having thus considered the general organization of the system according to FIG. 3, further consideration relative to the circuit logic involved will be considered under assumed operating conditions.

*Normal conditions*

To condition the system for operation, the radio communication system is turned on and a switch 30 is closed to pick up the relay RM. This relay remains energized as long as the remote brake control system is maintained in operation. The picking up of relay RM causes the picking up of its repeater relay RMP by energizing the winding of that relay upon charging a capacitor 31 through its front contact 32. A circuit is provided through back contact 33 of relay RMP and resistor 34 for discharging the capacitor 31 when the relay RMP becomes dropped away. Relay RMP is maintained picked up, however, by a stick circuit until pressure is built up in the brake line to cause the actuation of both the forward pressure switch FP and the rear pressure switch RP. This stick circuit includes contacts 35 and 36 of pressure switches FP and RP respectively connected in multiple and front contact 37 of relay RMP. Relay RMP can also be picked up in response to a reset code communicated from the main locomotive. This reset code causes energization of relays 9A and 10B, and in accordance therewith, the relay RMP can be energized through front contact 38 of relay 9A, front contact 39 of relay 10B and back contact 40 of relay EM.

Upon initiation of the system, the reset relay RST is in its dropped away position, and in accordance therewith, the relay AAS is energized through back contact 41 of relay RST. After the picking up of relay AAS, this relay is maintained energized by a stick circuit that is closed when any code is received from the main locomotive other than a code calling for the emergency application of the brakes. This circuit includes front contact 42 of relay AAS, back contact 43 of relay GAA, front contacts 44 and 45 of relays 9B and 10B connected in multiple, and front contact 46 of reset relay RST. The relay RST is normally maintained picked up after being picked up when the system is put into operation, dependent upon the reception of a valid code from the main locomotive.

In accordance with the relay AAS being in its energized position, and in accordance with the relay RMP having become picked up, a pick up circuit is closed for relay EM including front contact 47 of relay RMP, back contact 48 of relay 9A, and front contact 49 of relay AAS. The picking up of this relay closes a stick circuit at front contact 50 to shunt front contact 49 of relay AAS out of the circuit just described. Relay EM is maintained picked up as long as a code is received which provides for the energization of a relay 9B or 10B. The only code that does not call for the energization of one of these relays is a code calling for emergency application of the brakes according to the code table of FIG. 4. Thus, the pickup and stick circuits for relay EM include front contacts 51 and 52 of relays 10B and 9B, respectively connected in multiple with back contact 48 of relay 9A.

In order for a code received by the helper locomotive from the main locomotive to be valid, it must call for the energization of either relay 9A or 9B in the first channel and for the energization of either relay 10A or 10B in the second channel. If this condition is met, the reset relay RST is picked up and it is maintained energized through contacts 53, 54, 55 and 56 of relays 9A, 9B, 10A and 10B respectively and through front contact 57 of relay EM. With relays EM and RMP in their energized positions, the front emergency valve becomes energized to permit the building up of pressure in the brake line to the front of the helper locomotive. This valve is energized through front contact 58 of relay RMP and front contact 59 of relay EM. Similarly, the rear emergency valve is energized through front contact 60 of relay EM.

In accordance with the relay RMP, the reset relay RST and the relay EM being in their picked up positions, the relay MU becomes picked up, and the picking up of this relay energizes the sectionalizing valve SEC to sectionalize the brake line at the helper locomotive. The circuit by which relay MU is picked up includes front contact 94 of relay RMP and front contact 64 of relay EM. The picking up of relay MU applies energy to the sectionalizing valve SEC through front contact 65. Another circuit for energizing relay MU includes front contact 66 of relay RM, normally closed contact 67 of the flow indicator switch FI and front contact 64 of relay EM. This circuit provides that the line is not desectionalized upon loss of a brake control signal transmitted from the main locomotive unless the brakes are applied in the forward section 12a of the brake line.

When pressure builds up in the brake line, the forward and rear pressure switches FP and RP become operated to shift their contacts 35 and 36 respectively to their lower positions. This causes the dropping away of the relay RMP, and the shifting of these contacts provides for maintaining the forward emergency valve energized through contact 36 of switch RP in its lower position, and for maintaining relay EM energized through contact 35 of switch FP in its lower position to in turn energize the rear emergency valve through front contact 60 of relay EM.

When the brakes of the train have been initially released and the brake pipeline has been fully charged to 90 pounds pressure, the 90 pound pressure switch CI becomes actuated to close its contact 61 in its upper position and thereby provide for the picking up of relay CISP. Relay CISP is made slow to drop away so that its stick circuit will maintain this relay picked up during times of brake application when the pressure drops below the 90 pound level so as to open the pick up circuit just described. The shifting of contact 61 to its lower position under these conditions established a stick circuit for relay CISP through front contact 62 of relay CISP.

After the system has been put into operation as has been described, the main locomotive, with its brakes released, transmits normally an automatic release control code to the helper locomotive. This is the first code shown in the code table of FIG. 4 and comprises tones to energize relays 9B and 10B at the helper locomotive. With these relays energized, all of the relays are maintained energized that have been described as being picked up when setting the system into operation. Relay MU is energized when a valid code is received at the helper locomotive by a circuit including front contact 63 of relay RST and front contact 64 of relay EM.

If, however, the helper locomotive fails to receive a radio signal and there is a reduction in air pressure in the forward section 12a, relay MU becomes dropped away and valve SEC becomes deenergized to desectionalize the brake line 12. It will be readily apparent that the relay MU can be controlled to be fully dependent upon the reception of a radio control code as is indicated by the energization of relay RST, in accordance with the requirements of practice. If this is done, the brake control line 12 becomes desectionalized any time that the relay RST becomes dropped away.

In accordance with the sectionalizing having been rendered effective, the radio controlled brake valves are energized by a circuit including front contact 66 of relay RM, front contact 68 of relay MU, front contact 69 of relay EM and wire 70. Wire 71 which is connected to the radio controlled brake valves is normally deenergized as this wire is energized only at times when graduated braking is to be applied.

Emergency braking

If an emergency application of the brakes is made by the operator of the main locomotive, an emergency braking code is transmitted to the helper locomotive which picks up relays 9A and 10A (see the code table of FIG. 4). The picking up of relays 9A and 10A, with the relays 9B and 10B in their released positions maintains the reset relay RST energized, but deenergizes the relay EM. The dropping away of relay EM opens the circuit for the energization of the rear emergency valve at front contact 59 and this initiates application of emergency braking in the rear section 12b of the brake line. The dropping away of relay EM also deenergizes the forward emergency valve by the opening of front contact 60, however the forward section 12a is also put into an emergency braking condition by the main locomotive under the assumed conditions.

Another emergency braking condition may arise in case of a derailment, for example, which may cause a break in the continuity of the forward or rear portion 12a or 12b of the brake line. For the portion that is broken, the brakes become applied in accordance with air escaping at the point of the break. The reduction in the pressure for the line portion that is broken is detected by the associated pressure switch FP or RP, and such detection causes the deenergization of the emergency valve for the other portion. For example, if a break occurs in the rear section 12b of the brake line, the reduction in air pressure of this portion of the line causes the shifting of the contacts of the pressure switch RP to their upper positions, and thus the opening of contact 36 deenergizes the forward emergency valve so as to cause an emergency application of the brakes in the forward section as well. Similarly, if a break occurs in the forward section 12a, the pressure switch FP has its contacts actuated so that the contact 35 is opened and causes the dropping away of relay EM, which in turn deenergizes the rear emergency valve by the opening of front contacts 60 to provide for an emergency application of the brakes for the rear section 12b of the brake line.

Brake release

When the brakes are released on the main locomotive following an emergency brake application, the operator on the main locomotive can cause a reset control code to be transmitted to the helper locomotive by manual actuation of a reset button on the main locomotive. This causes the picking up of relays 9A and 10B on the helper locomotive, and in accordance with the energization of these relays, relay RMP becomes picked up by the energization of a circuit that has been described. Upon release of the reset button on the main locomotive, a brake release code is transmitted, and in accordance with reception of this code, with the relay RMP in its picked up position, the conditions described as normal conditions are re-established, and the brake line becomes sectionalized in accordance with the picking up of relay MU, and the brakes become released because of energization of wires 70 and 82.

If the automatic brake release code is transmitted after a brake application other than an emergency brake application, the relay EM is already in its picked up position in accordance with the energization of its stick circuit through the contacts 51, 52 and 48 of relays 10B, 9B and 9A connected in multiple, the contact 35 of the pressure switch FP being maintained in its lower position because of there having been no reduction in brake pressure such as to render an emergency brake application effective. If the brake application has been other than an emergency application, the relay GAA is in its picked up position and the relay AAS is dropped away. The relay AAS controls a valve in the helper locomotive for the control of the brake section 12b in such a manner that the picking up of relay AAS causes the release of the brakes for the rear section 12b, after which relay GAA becomes dropped away, in accordance with the application of energy to wire 82 through front contact 83 of relay AAS. Relay AAS becomes picked up in response to the automatic brake release code in accordance with energy applied to the winding of that relay through back contact 84 of relay 9A, front contact 85 of relay 9B, back contact 86 of relay 10A, front contact 87 of relay 10B, front contact 43 of relay GAA, front contact 45 of relay 10B and front contact 46 of relay RST. The opening of back contact 78 of relay AAS causes the dropping away of the relay GAA by the opening of its stick circuit. The dropping away of relay GAA establishes a stick circuit which has been described for maintaining the relay AAS energized. Relay AAS is made slow in dropping away to cover the cross-over time of the contact 43 of relay GAA in shifting from its front to its back contact position.

Graduated braking

Graduated braking is terminology applied to the application of the brakes of the train by gradual reduction in air pressure in steps of predetermined increments. These increments are applied intermittently until the desired amount of braking is provided. If a service application of the brakes is designated, the service application is obtained as a result of several successive braking increments the same as is accomplished to a more limited extent under graduated braking. On the main locomotive, under graduated braking conditions, the radio code transmitter senses each increment of braking applied by the main locomotive and transmits alternately graduated braking and reset codes for the respective increments. The reception of these alternative graduated braking and reset codes at the helper locomotive causes the helper locomotive to reduce air pressure in increments and at time intervals corresponding to the increments applied by the main locomotive.

When graduated braking is initiated on the main locomotive, a graduated braking code is transmitted which causes the picking up of relays 9B and 10A at the helper locomotive. With these relays picked up, the relay GAA becomes energized through back contact 73 of relay 9A, front contact 74 of relay 9B, front contact 75 of relay 10A, back contact 76 of relay 10B, front contact 77 of relay CISP and front contact 78 of relay AAS. The picking up of relay GAA opens the stick circuit for relay AAS at back contact 43 to cause that relay to become dropped away. The dropping away of relay AAS opens a circuit for a radio controlled brake valve at front contact 83 to cause an increment of braking to be applied in the braking section 12b.

The decoding relays 9B and 10A become dropped away at the end of the first graduated braking code pulse transmitted from the main locomotive, and the relays 9A and 10B become picked up on the helper locomotive in accordance with the transmission of a reset code pulse from the main locomotive. The picking up of these relays, with the relay GAA in its picked up position provides an energizing circuit for brake control wire 71 which energizes a radio controlled brake valve. Energy is applied to wire 71 through contacts 88 and 89 of relays 10B and 9B connected in multiple, front contact 81 of relay GAA and front contacts 90 and 91 of relays 10B and 9A connected in multiple.

If the operator of the main locomotive is still designating graduated braking so that a second braking pulse is provided, the mode of operation substantially as it has been described is repeated wherein a second graduated braking pulse is transmitted followed by a second reset pulse. The reception of the second graduated braking pulse at the helper locomotive causes the relays 9A and 10B to be dropped away and the relays 9B and 10A to be picked up to provide for deenergization of wire 71 to thereby cause another increment of braking in the braking section 12b.

It is therefore provided that during graduated braking the graduated braking relay GAA is maintained energized by its stick circuit including front contacts 88 and 89 of relays 9B and 10B connected in multiple, front contact 81 of relay GAA and back contact 78 of relay AAS. The relay AAS remains in its dropped away position throughout the period of graduated braking. The reception alternately of graduated braking and reset codes pulses the brake control wire 71 to provide an additional increment of braking for each pulse. When the brakes are released on the main locomotive to mark the end of graduated braking, an automatic release code is transmitted which picks up relays 9B and 10B on the helper locomotive and closes a pick up circuit for relay AAS including back contact 84 of relay 9A, front contact 85 of relay 9B, back contact 86 of relay 10A, front contact 87 of relay 10B, front contact 43 of relay GAA, front contacts 44 and 45 of relays 9B and 10B connected in multiple and front contact 46 of reset relay RST. Relay GAA becomes dropped away because of the opening of its stick circuit at front contact 78 of relay AAS. The picking up of relay AAS releases the brakes by application of energy through its front contact 83 to brake control wire 82.

Under conditions where there is a loss of radio signal communication to the helper locomotive, the sectionalizing valve SEC becomes deenergized and the brake line becomes de-sectionalized, provided brakes are applied by the main locomotive as has been heretofore described. If the radio signal is subsequently restored, valve SEC again becomes energized to sectionalize the brake line, irrespective of the condition of the brake line 12 at that time. Thus sectionalizing can become effective, for example, when the brakes are applied and pressure is reduced in the brake line 12. Under such conditions, it is desirable to have the helper locomotive sense the pressure in the brake line 12 at the time of sectionalization, and to govern the helper locomotive brake control apparatus in a manner to maintain the same condition of braking immediately after sectionalization that was effective just prior to sectionalization.

For this purpose, an equalizer pressure tank ER is provided that is charged to a pressure corresponding to the brake line 12 at the helper locomotive upon loss of radio signal, and which pressure is used to balance the radio controlled brake valves with the pressure of the rear brake line 12b at the time of sectionalization. Such balance insures that there will be no charge in pressure in the section 12b as compared to the section 12a as a result of restoration of the radio signal to sectionalize the brake line 12.

An equalizer valve EV is provided at the helper locomotive for the purpose of providing the above described mode of operation. This valve is energized from the radio valve control wire 70 so as to be energized whenever sectionalization of the brake line 12 is rendered effective. Upon loss of radio energy, the valve EV becomes deenergized, and upon deenergization, it connects the equalizer pressure reservoir ER to the brake line 12b. If the radio signal is restored, the equalizer valve EV becomes energized, and in accordance therewith, the equalization reservoir ER is connected to the radio controlled brake valves in a control section wherein the pressure on one side of the valve is balanced against a corresponding pressure that is existing in the rear line section 12b. Because of these pressures being in balance, the radio controlled brake valves do not change the pressure in the rear section 12b as compared to the pressure existing at the time of sectionalization, and thus equal pressure is maintained throughout the entire train. The radio controlled brake valves, however, are subject to operation as has been described in accordance with the subsequent application of different control codes by the main locomotive.

Having thus described one embodiment of the present invention as applied to the control of brakes in a multiple unit train, it is desired to be understood that this form is selected to facilitate the disclosure of the invention, rather than to limit the number of forms the invention may assume. While the invention has been described in its preferred embodiment, it is to be understood that the words which have been used are words of description rather than of limitation, and that changes within the purview of the appending claims may be made without departing from the true spirit and scope of the invention in its broader aspects.

What is claimed is:

1. A brake control system for a multiple unit train having a main locomotive at the head of the train and a helper locomotive at an intermediate point in the train, each of the locomotives having air brake control apparatus, comprising, communication means for communicating brake control signals from the main locomotive to the helper locomotive, a brake control air line extending throughout substantially the entire length of the train for controlling application of brakes by the respective cars of the train in accordance with air pressure in the air line, sectionalizing means controlled by at least one of the brake control signals communicated from the main locomotive for sectionalizing the brake line at the location of the helper locomotive in the train into forward and rear control sections, and means effective when the brake line is sectionalized for controlling the rear section of the line by the air brake control apparatus associated with the helper locomotive in accordance with the brake control signals communicated from the main locomotive.

2. A brake control system according to claim 1 wherein the sectionalizing means is rendered ineffective to sectionalize the brake line when no signal is received from the main locomotive.

3. A brake control system according to claim 1 wherein the sectionalizing means comprises an electrically operated valve that causes the brake line to be sectionalized at the location of the helper locomotive only when the electrically operated valve is energized, and means is provided for energizing the electrically operated valve in response to a signal communicated from the main locomotive.

4. A brake control system according to claim 2 wherein means is provided for selectively maintaining the brake control line sectionalized or not sectionalized when no signal is received from the main locomotive dependent upon whether or not the air brakes are applied in the forward section of the train.

5. A brake control system according to claim 3 wherein further means is provided for energizing the electrically operated valve irrespective of the reception of a signal from the main locomotive provided that normal pressure is maintained by the main locomotive in the forward section of the brake control pipeline.

6. A brake control system for a multiple unit train having a main locomotive at the head end of the train and a helper locomotive at an intermediate point in the train, each of the locomotives having air brake control apparatus, comprising, a brake control air line extending throughout substantially the entire length of the train for controlling application of brakes of the respective cars of the train in accordance with the air pressure in the air line, communication means for communicating selectively braking and brake release controls from the main locomotive to the helper locomotive, means governed by the communication means for selectively sectionalizing the brake line at the location of the helper locomotive in the train into forward and rear sections respectively so that the forward and rear sections can be controlled respectively by the brake control apparatus of the main and helper locomotive, and pressure equalizing means for equalizing pressure in the brake control apparatus of the helper locomotive with brake control pressure in the air line at the time when said sectionalizing means is rendered effective.

7. A brake control system according to claim 6 wherein the sectionalizing means includes a sectionalizing valve in the pipeline controlled by the communication means.

8. A brake control system according to claim 7 wherein the pressure equalizing means includes a pressure reservoir that is charged from the brake line before sectionalizing.

References Cited

UNITED STATES PATENTS 3,206,257  9/1965  May _____ 303—3 X

DUANE A. REGER, *Primary Examiner.*